United States Patent
Uehara

(10) Patent No.: US 8,269,616 B2
(45) Date of Patent: Sep. 18, 2012

(54) METHOD AND SYSTEM FOR DETECTING GAPS BETWEEN OBJECTS

(75) Inventor: Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 580 days.

(21) Appl. No.: 12/504,635

(22) Filed: Jul. 16, 2009

(65) Prior Publication Data

US 2011/0012718 A1    Jan. 20, 2011

(51) Int. Cl.
B60Q 1/00    (2006.01)

(52) U.S. Cl. ...................................... 340/435; 340/932.2

(58) Field of Classification Search .................. 340/435, 340/932.2, 436, 437, 438, 937; 348/744
See application file for complete search history.

(56) References Cited

U.S. PATENT DOCUMENTS

| | | |
|---|---|---|
| 3,519,805 A | 7/1970 | Thorne-Booth |
| 3,783,974 A | 1/1974 | Gilbert et al. |
| 3,828,236 A | 8/1974 | Close |
| 3,848,671 A | 11/1974 | Kern |
| 3,918,552 A | 11/1975 | Kameyama et al. |
| 4,075,500 A | 2/1978 | Oman et al. |
| 4,380,049 A | 4/1983 | Makinen |
| 4,760,529 A | 7/1988 | Takata et al. |
| 4,926,630 A | 5/1990 | Shekleton |
| 5,046,919 A | 9/1991 | Wulf |
| 5,186,270 A | 2/1993 | West |
| 5,421,432 A | 6/1995 | Strambi et al. |
| 5,434,927 A | 7/1995 | Brady et al. |
| 5,474,370 A | 12/1995 | Ravndal |
| 5,604,821 A | 2/1997 | Ranganathan et al. |
| 5,739,657 A | 4/1998 | Takayama et al. |
| 5,774,591 A | 6/1998 | Black et al. |
| 6,246,787 B1 | 6/2001 | Hennessey et al. |
| 6,556,775 B1 | 4/2003 | Shimada |
| 6,647,324 B2 * | 11/2003 | Creutzburg et al. .............. 701/1 |
| 6,690,815 B2 | 2/2004 | Mihara et al. |
| 6,731,777 B1 | 5/2004 | Nishigaki et al. |
| 6,804,396 B2 | 10/2004 | Higaki et al. |
| 6,853,738 B1 | 2/2005 | Nishigaki et al. |
| 6,907,335 B2 | 6/2005 | Oswald et al. |
| 6,963,656 B1 | 11/2005 | Persaud et al. |
| 6,985,623 B2 | 1/2006 | Prakash et al. |

(Continued)

FOREIGN PATENT DOCUMENTS

DE    10330922    2/2005

(Continued)

*Primary Examiner* — Toan N Pham
(74) *Attorney, Agent, or Firm* — Snell & Wilmer LLP

(57) ABSTRACT

The present invention is directed to a method and system to determine gaps, such as parking spaces, between objects. A sensor acquires a set of scanning data. A noise filter unit filters the set of scanning data and a data derivative unit generates a set of derivative data from the set of scanning data. A data analysis unit determines locations of gaps by selectively analyzing the set of derivative data which exceed a first predetermined distance and/or a second predetermined distance. The gap definition unit determines the substantial locations, shapes, and sizes of the gaps based on the previously defined location from the data analysis unit. A report generation unit generates a report including the set of gaps defined by the gap definition unit. The report is displayed on a display in a color coded format easily visible and discernable to a driver of the automobile.

20 Claims, 7 Drawing Sheets

U.S. PATENT DOCUMENTS

| | | |
|---|---|---|
| 7,000,200 B1 | 2/2006 | Martins |
| 7,018,166 B2 | 3/2006 | Gaskell |
| 7,056,185 B1 | 6/2006 | Anagnostou |
| 7,085,693 B2 | 8/2006 | Zimmerman |
| 7,106,887 B2 | 9/2006 | Kinjo |
| 7,142,600 B1 | 11/2006 | Schonfeld et al. |
| 7,218,011 B2 | 5/2007 | Hiel et al. |
| 7,230,538 B2 | 6/2007 | Lai et al. |
| 7,293,790 B2 | 11/2007 | Byun et al. |
| 7,340,077 B2 | 3/2008 | Gokturk et al. |
| 7,340,100 B2 | 3/2008 | Higaki et al. |
| 7,340,393 B2 | 3/2008 | Mitsuyoshi |
| 7,354,245 B2 | 4/2008 | Baba |
| 7,359,563 B1 | 4/2008 | Dua et al. |
| 7,370,466 B2 | 5/2008 | Cai |
| 7,383,238 B1 | 6/2008 | Iverson |
| 7,391,339 B2 * | 6/2008 | Howard et al. ............ 340/932.2 |
| 7,403,640 B2 | 7/2008 | Zhang et al. |
| 7,440,615 B2 | 10/2008 | Gong et al. |
| 7,489,802 B2 | 2/2009 | Smilansky |
| 7,641,288 B1 | 1/2010 | Baker et al. |
| 2003/0075907 A1 | 4/2003 | Baumann et al. |
| 2005/0002561 A1 | 1/2005 | Monachino et al. |
| 2005/0063566 A1 | 3/2005 | Beek et al. |
| 2005/0085984 A1 | 4/2005 | Uhler et al. |
| 2006/0028556 A1 | 2/2006 | Bunn et al. |
| 2006/0045354 A1 | 3/2006 | Hanna et al. |
| 2006/0104488 A1 | 5/2006 | Bazakos et al. |
| 2007/0027604 A1 | 2/2007 | Cuevas et al. |
| 2007/0098222 A1 | 5/2007 | Porter et al. |
| 2007/0140595 A1 | 6/2007 | Taylor et al. |
| 2007/0147678 A1 | 6/2007 | Gotting et al. |
| 2007/0211947 A1 | 9/2007 | Tkacik |
| 2007/0297647 A1 | 12/2007 | Hung-Chi |
| 2008/0002856 A1 | 1/2008 | Ma et al. |
| 2008/0049150 A1 * | 2/2008 | Herbin et al. ................. 348/744 |
| 2008/0056548 A1 | 3/2008 | Irarrazaval et al. |
| 2008/0061559 A1 | 3/2008 | Hirshberg |
| 2008/0063273 A1 | 3/2008 | Shimodaira |
| 2008/0069400 A1 | 3/2008 | Zhu et al. |
| 2008/0095435 A1 | 4/2008 | Lipton et al. |
| 2008/0144961 A1 | 6/2008 | Litzenberger et al. |
| 2008/0170748 A1 | 7/2008 | Albertson et al. |
| 2008/0186386 A1 | 8/2008 | Okada et al. |
| 2008/0220692 A1 | 9/2008 | Torres et al. |
| 2008/0253617 A1 | 10/2008 | Ernst et al. |
| 2008/0260210 A1 | 10/2008 | Kobeli et al. |
| 2008/0260212 A1 | 10/2008 | Moskal et al. |
| 2008/0273765 A1 | 11/2008 | Tsujimura |
| 2008/0292151 A1 | 11/2008 | Kurtz et al. |
| 2009/0003661 A1 | 1/2009 | Ionita et al. |
| 2009/041297 A1 | 2/2009 | Zhang et al. |
| 2009/0060287 A1 | 3/2009 | Hyde et al. |
| 2009/0087308 A2 | 4/2009 | Presz, Jr. et al. |
| 2009/0097964 A1 | 4/2009 | Presz, Jr. et al. |
| 2009/0146842 A1 * | 6/2009 | Jung .......................... 340/932.2 |
| 2010/0038960 A1 | 2/2010 | Takenaka et al. |
| 2010/0096905 A1 | 4/2010 | Takenaka et al. |

FOREIGN PATENT DOCUMENTS

| | | |
|---|---|---|
| EP | 1614585 A1 * | 1/2006 |
| JP | 58086803 | 5/1983 |
| JP | 9058461 | 3/1997 |
| JP | 2003259502 | 9/2003 |
| JP | 2003338997 | 11/2003 |
| JP | 3738266 | 1/2006 |
| JP | 2006335277 | 12/2006 |
| JP | 2007094990 | 4/2007 |
| JP | 2007196867 | 8/2007 |
| JP | 2007210576 | 8/2007 |
| JP | 2008279848 | 11/2008 |
| WO | WO 86-03132 | 6/1986 |
| WO | WO 2007029454 | 3/2007 |
| WO | WO 2007039927 | 4/2007 |
| WO | WO 2007132323 | 11/2007 |

* cited by examiner

METHOD AND SYSTEM FOR DETECTING GAPS BETWEEN OBJECTS

BACKGROUND

1. Field of the Invention

The present invention relates to a method and system for recognizing objects from a vehicle and more particularly to a method and system for detecting gaps between objects.

2. Description of the Related Art

When driving in an automobile, a driver is scanning the road constantly for gaps between objects in order to determine where the driver can move his automobile. For example, the driver may wish to park the automobile in an empty parking space or safely change lanes between multiple automobiles. However, when determining where gaps exist between objects, the driver is limited by ocular capabilities. Even if the driver has 20/20 vision, he can only see with a limited angle and for a limited distance. Furthermore, the driver cannot peer through objects. Thus, the driver must drive closer to the parking space to determine if the parking space exists or not. However, in driving closer to the parking space, the driver may pass up other parking spaces. If the parking space that the driver thought was empty is actually filled, the driver must now turn around and attempt to remember which parking spaces are empty. This can be frustrating for the driver and be time and fuel consuming.

The problem is also compounded by the presence of different types of parking spaces such as perpendicular parking spaces and parallel parking spaces, each of which have different visual characteristics which are not easily discernable by the human eye.

Thus, there is a need for a better method and system to determine gaps between objects for assisting drivers of vehicles.

SUMMARY

The present invention is directed to a method and system to determine gaps between objects. A sensor acquires a set of scanning data. A noise filter unit filters the set of scanning data and a data derivative unit generates a set of derivative data from the set of scanning data. A data analysis unit determines locations of gaps by selectively analyzing the set of derivative data which exceed a first predetermined distance and/or a second predetermined distance.

The first predetermined distance can be selected to correspond to a width of an automobile and/or a parking width of the automobile. The second predetermined distance can be selected to correspond to a length of the automobile and/or a parking length of the automobile. By selectively analyzing the set of derivative data, the present invention increases a processing efficiency of data and also allows the determination of characteristics of the gap such as whether the gap is a perpendicular parking space or a parallel parking space.

The gap definition unit determines the substantial locations, shapes, and sizes of the gaps based on the previously defined location from the data analysis unit. A report generation unit generates a report including the set of gaps defined by the gap definition unit. The report is displayed on a display in a color coded format easily visible and discernable to a driver of the automobile. This allows the driver to easily determine the characteristics of the gaps.

In one embodiment, the present invention is a method for detecting gaps between objects including acquiring a set of scanning data, each of the scanning data indicating, for a sequential location, a distance of a nearest object from a predetermined location, filtering the set of scanning data to remove noise, determining a set of derivative data from the set of scanning data, analyzing the set of derivative data greater than a first predetermined distance, defining a first set of gaps between objects based on the set of derivative data greater than the first predetermined distance, and generating a report including the first set of gaps between objects.

In another embodiment, the present invention is a method for detecting gaps between objects including acquiring a set of scanning data, each of the scanning data indicating, for an angular location, a distance of a nearest object from a predetermined location, filtering the set of scanning data to remove noise, determining a set of derivative data from the set of scanning data, analyzing the set of derivative data greater than a first predetermined distance, analyzing the set of derivative data greater than a second predetermined distance, the second predetermined distance being greater than the first predetermined distance.

The present invention also includes defining a first set of gaps between objects based on the set of derivative data greater than the first predetermined distance, defining a second set of gaps between objects based on the set of derivative data greater than the second predetermined distance, and generating a report including the first set of gaps between objects and the second set of gaps between objects.

In yet another embodiment, the present invention is a system in an automobile for detecting gaps between objects including a sensor acquiring a set of scanning data, each of the scanning data indicating, for a sequential location, a distance of a nearest object from a predetermined location, a noise filter unit communicatively coupled to the sensor filtering the set of scanning data to remove noise, a data derivative unit communicatively coupled to the noise filter extracting a set of derivative data from the set of scanning data, and a data analysis unit communicatively coupled to the data derivative unit analyzing the set of derivative data greater than a first predetermined distance, and analyzing the set of derivative data greater than a second predetermined distance, the second predetermined distance being greater than the first predetermined distance.

The present invention also includes a gap definition unit communicatively coupled to the data analysis unit defining a first set of gaps between objects based on the set of derivative data greater than the first predetermined distance, and defining a second set of gaps between objects based on the set of derivative data greater than the second predetermined distance, and a report generation unit communicatively coupled to the gap generation unit generating a report including the first set of gaps between objects and the second set of gaps between objects.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
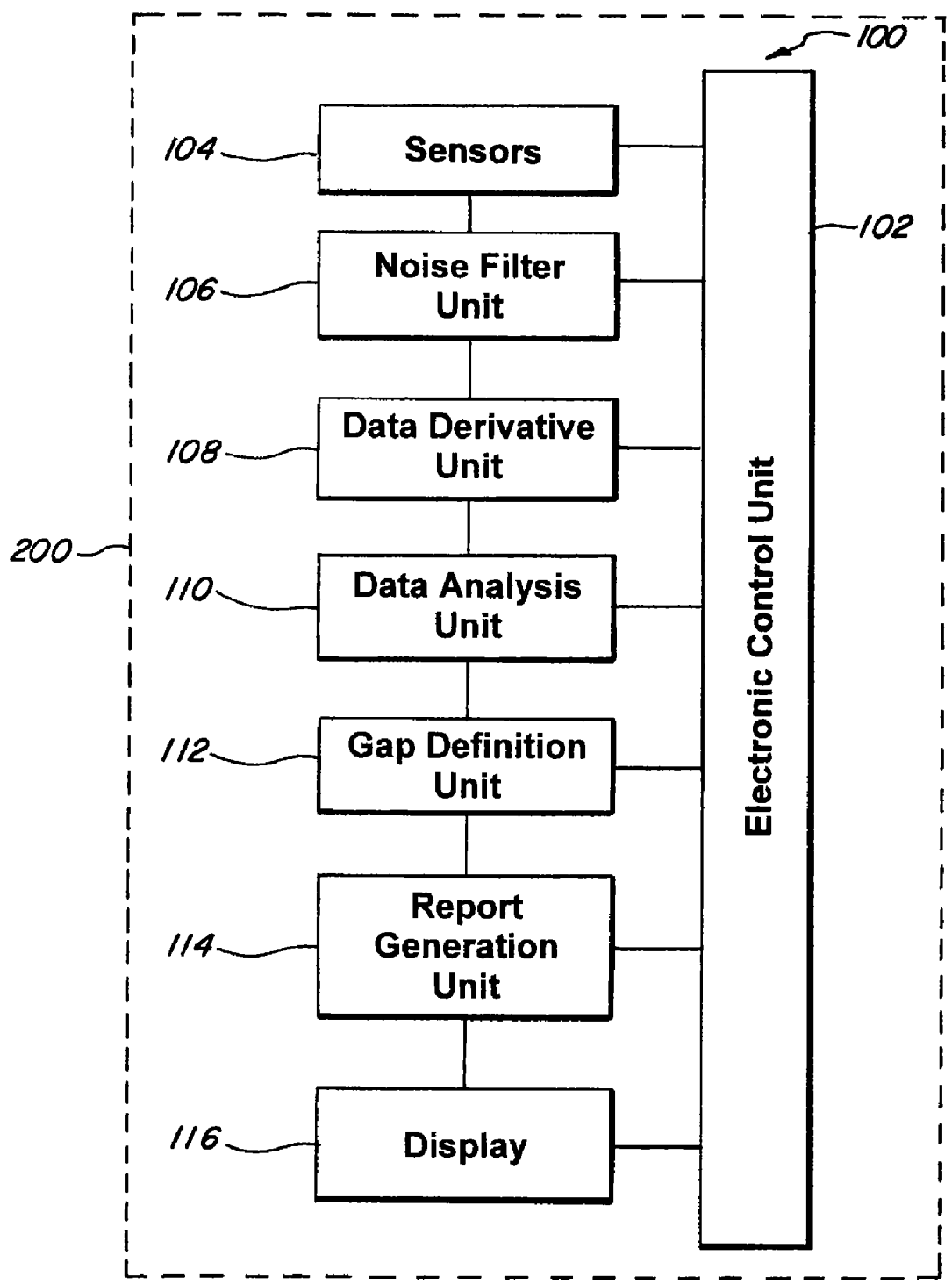
FIG. 1 is a box diagram of an embodiment of the present invention.

In one embodiment, the present invention is a gap detection system 100 for detecting gaps between objects as seen in FIG. 1. The gap definition system includes an electronic control unit ("ECU") 102, a sensor 104, a noise filter unit 106, a data derivative unit 108, a data analysis unit 110, a gap definition unit 112, a report generation unit 114, and a display 116. The ECU 102, the sensor 104, the noise filter unit 106, the data derivative unit 108, the data analysis unit 110, the gap definition unit 112, the report generation unit 114, and the display 116, can each be communicatively coupled to one or more of the components in the gap detection system 100.

Figure 2:
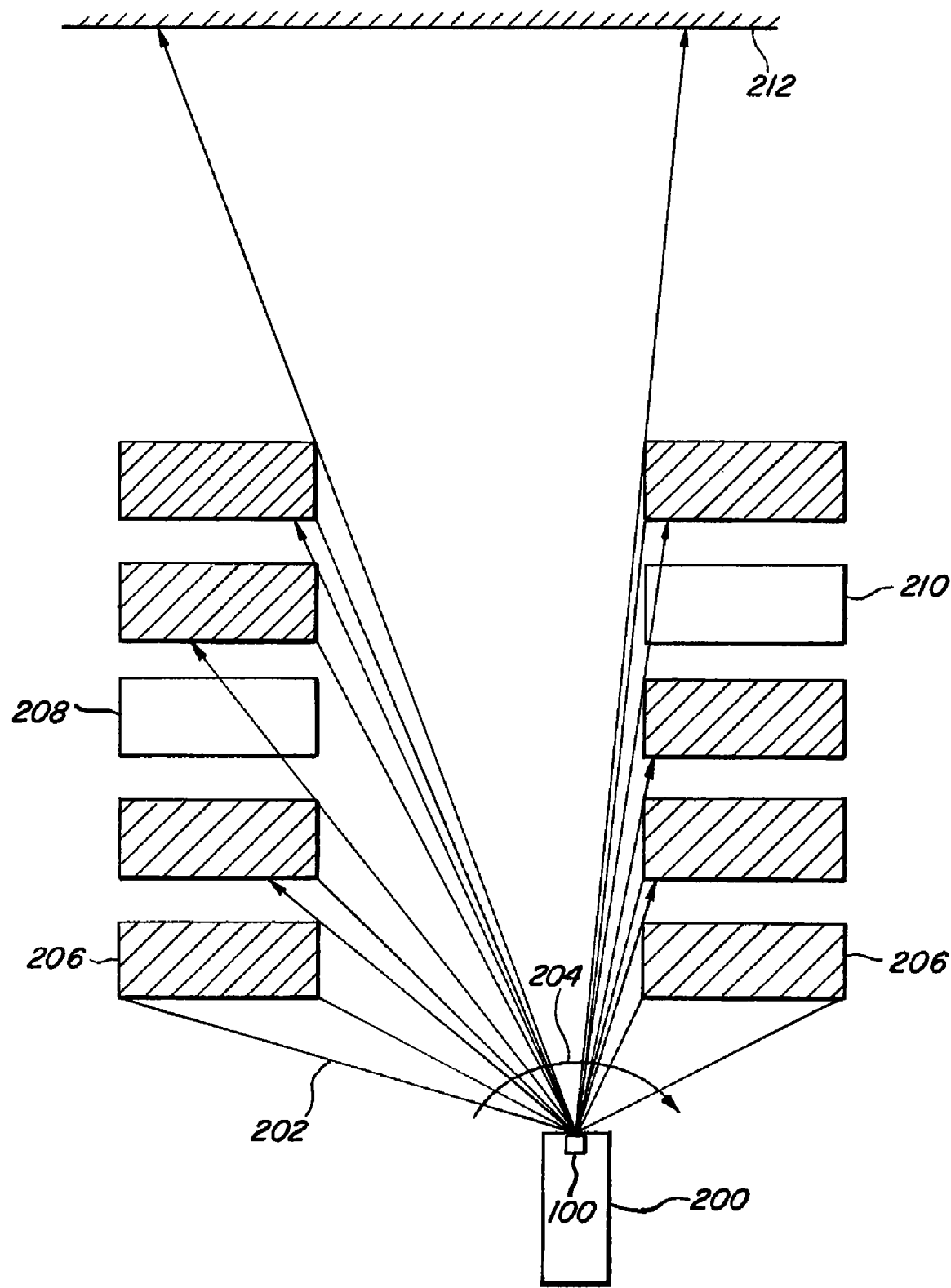
FIG. 2 depicts an embodiment of the present invention in operation.

As seen in FIGS. 1 and 2, the gap detection system 100 can be implemented, for example, in a transportation device, such as an automobile 200. In addition, the transportation device can also be, for example, an airplane, a bicycle, a motorcycle, a tank, or any other type of machine capable of transporting objects and/or people. The present invention can also be embodied in other systems to facilitate gap detection such as in cameras, binoculars, missiles, etc. The gap detection system 100 can transmit waves 202 over sequential locations 204 to detect a distance to portions of objects 206 and portions of gaps 208 and 210 between the objects 206. The sequential location can be any type of location in sequence such as an angular location.

In FIG. 2, the sequential locations 204 are angular locations. Thus, the waves 202 are transmitted over a predetermined angle. In one embodiment, the sensor repeatedly sweeps over the predetermined angle to generate the set of scanning data. Although FIG. 2 depicts the waves 202 being transmitted horizontally, they can also be transmitted vertically at an angle, too. Likewise, although the set of scanning data used throughout the disclosure refers to a 2D set of scanning data, the set of scanning data can be any type of scanning data such as 1D, 2D, 3D, or n-dimensional (nD) scanning data where n can be, for example, any integer. For example, the set of scanning data can be a 3D scanning data to detect 3D objects or gaps.

Referring back to FIG. 1, the ECU 102 controls the sensor 104, the noise filter unit 106, the data derivative unit 108, the data analysis unit 110, the gap definition unit 112, the report generation unit 114, and/or the display 116. The ECU 102 can also facilitate communication between each of the components in the gap detection system 100 and/or other components within the automobile 200. Although FIG. 1 discloses the use of the ECU 102, other processors can also be used.

The sensor 104 acquires a set of scanning data. Each of the scanning data indicating, for a sequential location 204, a distance of a nearest object 206 from a predetermined location. The predetermined location can be, for example, an edge of the automobile 200, a location of the sensor 104, or any other component in the automobile 200. The edge of the automobile 200 can be the edge of the automobile 200 closest to the nearest object 206 or another edge of the automobile 200. The sensor 104 can be, for example, an infrared sensor, a radar detector, an image sensor, a laser sensor, an electromagnetic sensor, a thermal sensor, or any other type of device capable of determining distances of an object from a predetermined location. The sensor 104 can also include any number of sensors.

The noise filter unit 106 is communicatively coupled to the sensor 104 and filters the set of scanning data to remove noise. The noise filter unit 106 can apply a time domain frequency filter and/or a spatial domain frequency filter to the set of scanning data.

Figure 3:
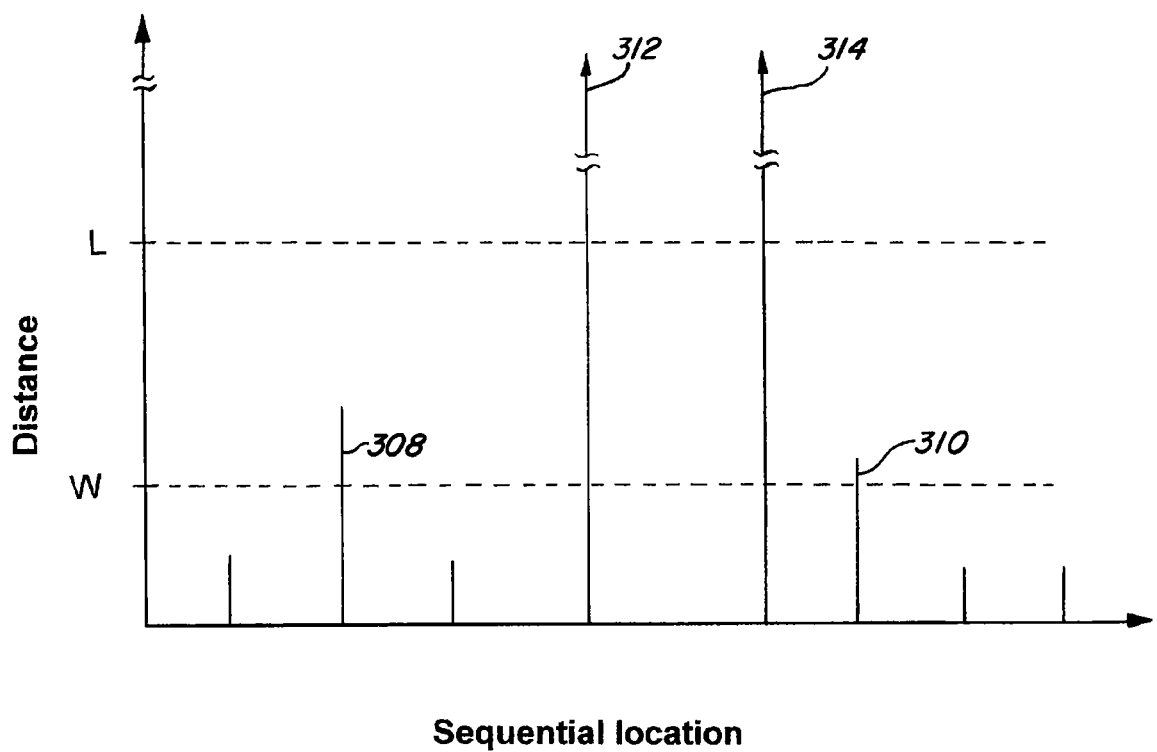
FIG. 3 is a graph of a set of derivative data.

The data derivative unit 108 is communicatively coupled to the noise filter unit 106 and generate or determining a set of derivative data from the set of scanning data as shown in FIG. 3. By generating or determining the set of derivative data, the data derivative unit 108 can eliminate a scaling factor in the set of scanning data. When taking the derivative of the set of scanning data, the set of scanning data is arranged sequentially according to their sequential location. For example, if the sequential location is an angular location, data at 10 degrees will be arranged adjacent to data at 9 degrees and 11 degrees. Likewise, data at 11 degrees will be arranged adjacent to data at 10 degrees and 12 degrees.

The data analysis unit 110 is communicatively coupled to the data derivative unit 108 and analyzes the set of scanning data shown in FIG. 3. The data analysis unit 110 analyzes the set of derivative data greater than a first predetermined distance and/or a second predetermined distance. The second predetermined distance is greater than the first predetermined distance. In one embodiment, the data analysis unit 110 can also use any number of predetermined distances.

Figure 8:
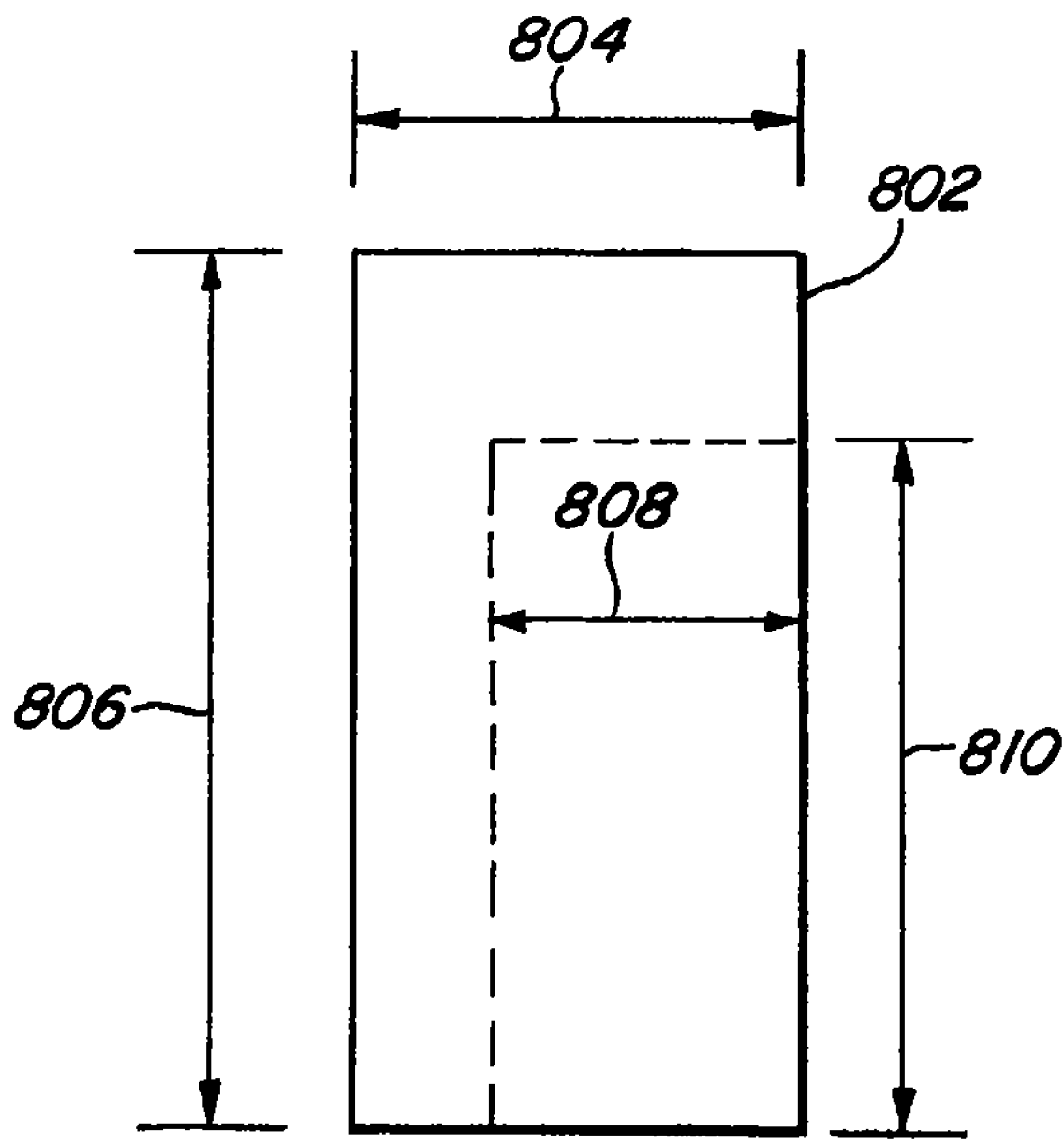
FIG. 8 depicts dimensions of a parking space.

In one embodiment, the first predetermined distance is at least a width of the automobile 200 or substantially a width of the automobile 200 as seen by width 808 in a parking space 802 in FIG. 8. The second predetermined distance is at least a length of the automobile 200 or substantially a length of the automobile 200 as seen by length 810 in the parking space 802. This allows only gaps which the automobile can actually fit in to be analyzed and reduces false positives for the gaps, since gaps in which the automobile 200 cannot fit in would not be of interest to a driver of the automobile 200.

In another embodiment, the first predetermined distance is at least a parking width of the automobile 200 as seen by width 804 in the parking space 802 in FIG. 8. The second predetermined distance is at least a parking length of the automobile 200 as seen by length 806 in the parking space 802. The parking width of the automobile 200 is the distance necessary for the automobile 200 to park. The parking length of the automobile 200 is the distance necessary for the automobile 200 to park.

The parking width of the automobile 200 and/or the parking length of the automobile 200 can be determined, for example, by an amount of space necessary to completely or partially open one or more doors in the automobile 200, an amount of space necessary for one or more occupants inside the automobile 200 to enter and/or exit the automobile 200, the width of the automobile 200, the length of the automobile 200, the location of objects in an area surrounding the automobile 200, the location of the nearest objects in an area surrounding the automobile 200, or any other factors which would impact an ability of the automobile 200 to park in a gap.

The data analysis unit 110 analyzes the set of derivative data greater than the first predetermined distance when the data analysis unit 110 is searching for perpendicular parking spaces such as perpendicular parking spaces 208 and 210. Perpendicular parking spaces are parking spaces where a line parallel to a lengthwise direction of the parking space is substantially perpendicular to a line parallel to a lengthwise direction of the automobile 200 as shown in FIG. 2.

When the data analysis unit 110 is searching for a perpendicular parking space, the data analysis unit 110 analyzes a graph of a set of derivative data corresponding to FIG. 2 for derivative data which exceed the first predetermined distance. FIG. 3 is a graph of a set of derivative data corresponding to FIG. 2. In FIG. 3, the first predetermined distance is the "width" as indicated by the letter "W" and the dotted line corresponding to the letter "W" while the second predetermined distance is the "length" as indicated by the letter "L" and the dotted line corresponding to the letter "L."

In FIG. 3, the data analysis unit 110 identifies the data 308, 310, 312, and 314 as data which can be further analyzed for prospective parking spaces. Through the analysis, the data analysis unit 110 can determine that data 308 and 310 correspond to parking spaces 208 and 210, respectively. However, upon further analysis data 312 and 314 correspond to the wall 212. To analyze the data 308, 310, 312, and 314, the data analysis unit 110 can, for example, apply algorithms, request and/or receive more data, apply filters, use image data, use video data, use other data from other sets of derivative data, use electromagnetic waves, and/or any other type of analysis which will aid in accurately determining whether the data 308, 310, 312 and/or 314 correspond to a parking space or not.

In one embodiment, the data analysis unit 110 can analyze the graph in FIG. 3 for derivative data which exceed the first predetermined distance, but which do not exceed the second predetermined distance. In such a case, the data analysis unit 110 would only identify the data 308 and 308 for further analysis as prospective parking spaces.

Figure 4:
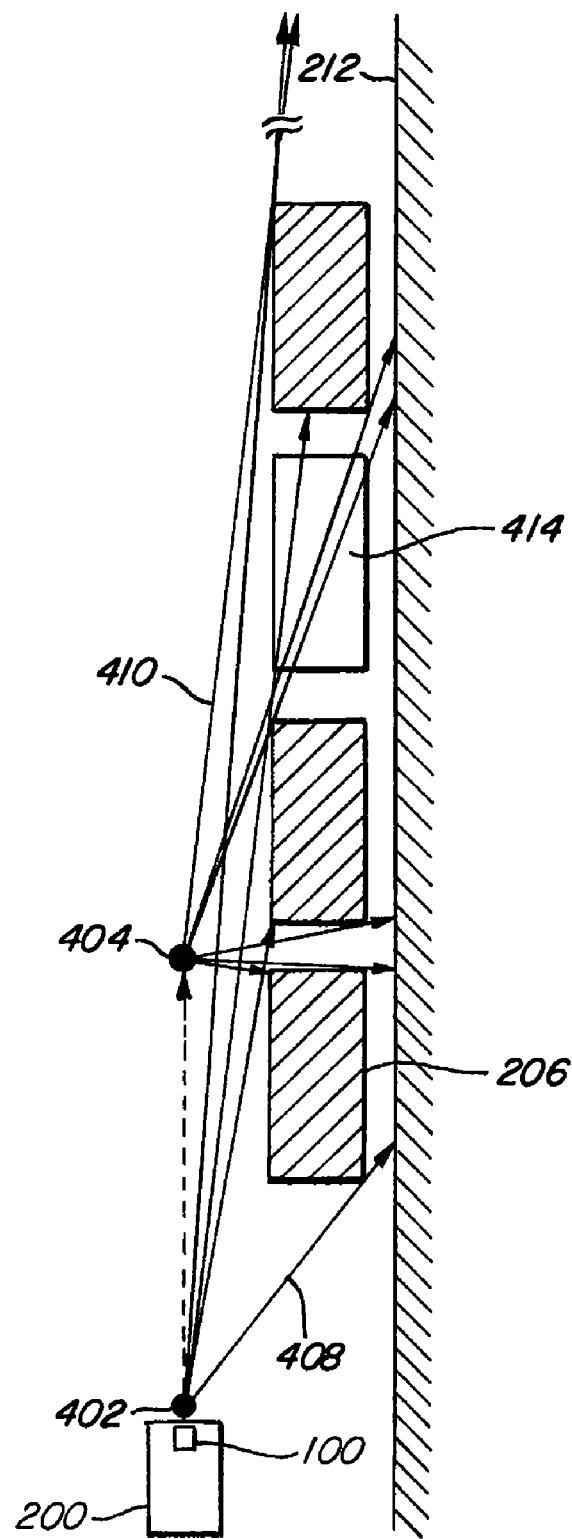
FIG. 4 depicts an embodiment of the present invention in operation.

The data analysis unit 110 can also search for parallel parking spaces such as a parallel parking space 414 and/or use multiple sets of scanning data to determine a location of parallel parking spaces as shown in FIG. 4. Parallel parking spaces are parking spaces where a line parallel to a lengthwise direction of the parking space is substantially parallel to a line parallel to a lengthwise direction of the automobile 200. In FIG. 4, two sets of scanning data are acquired. This can occur, for example, if the automobile 200 moves from a location 402 to a location 404. Thus, one set of scanning data is acquired at location 402 using waves 408, while another set of scanning data is acquired at location 404 using waves 410. Both sets of scanning data are normalized using a derivative function to generate two sets of derivative data. A graph of the set of derivative data corresponding to the scanning data acquired at location 402 is shown in FIG. 5 while a graph of the set of derivative data corresponding to the scanning data acquired at location 404 is shown in FIG. 6.

Figure 5:
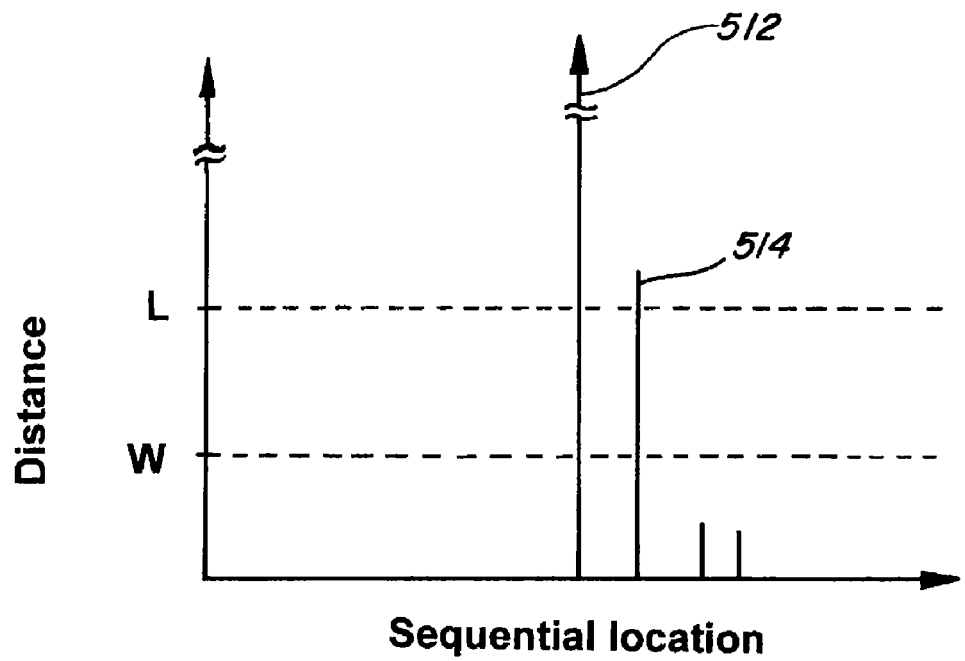
FIG. 5 is a graph of a set of derivative data.
Figure 6:
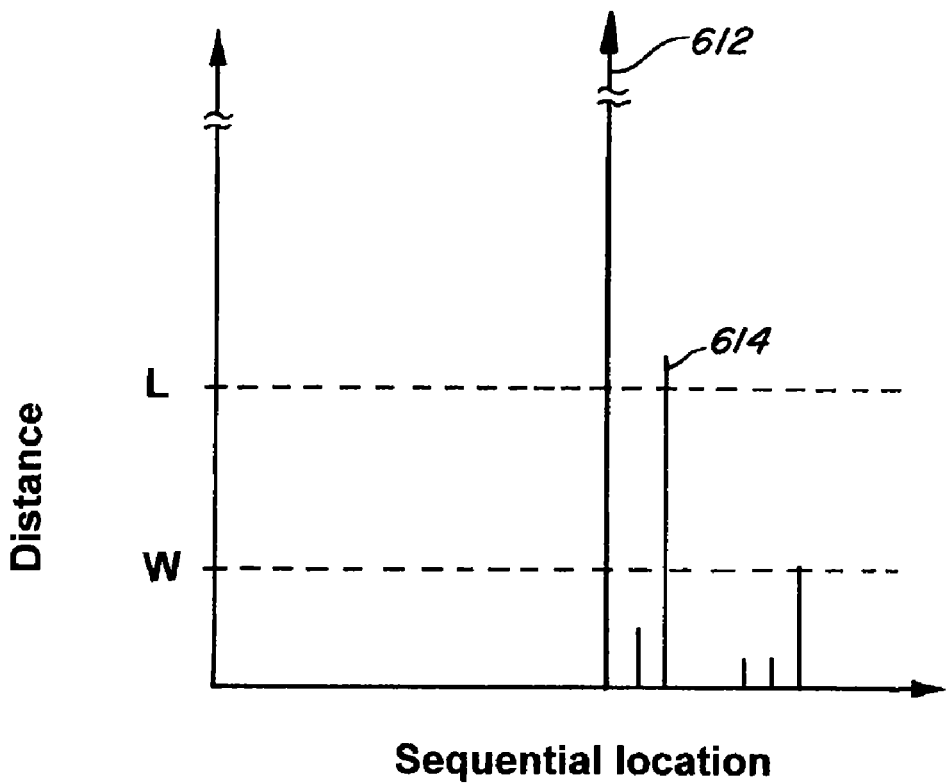
FIG. 6 is a graph of a set of derivative data.

In FIGS. 5 and 6, to determine the location of parallel parking spaces, the data analysis unit 110 analyzes the set of derivative data shown in FIGS. 5 and 6 for derivative data which exceed the second predetermined distance. In FIGS. 5 and 6, the first predetermined distance is the "width" as indicated by the letter "W" and the dotted line corresponding to the letter "W" while the second predetermined distance is the "length" as indicated by the letter "L" and the dotted line corresponding to the letter "L." As seen in FIGS. 5 and 6, the data 512, 514, 612, and 614 exceed the second predetermined distance. The data 512, 514, 612, and 614 can be selected for further analysis since they exceed the second predetermined distance. By selectively choosing the data 512, 514, 612, and 614 for analysis, other data which do not exceed the second predetermined distance are not analyzed. This can improve a processing efficiency of the data.

Analyzing the data 512, 514, 612, and 614, the data analysis unit 110 can determine, for example, that the data 514 and 614 correspond to the parallel parking space 414 while the data 512 and 612 correspond to the wall 212. The data analysis unit 110 can, for example, apply algorithms, request and/or receive more data, apply filters, use image data, use video data, use other data from other sets of derivative data, use electromagnetic waves, and/or any other type of analysis which will aid in accurately determining whether the data 512, 514, 612, and/or 614 correspond to a parking space or not. For example, the data analysis unit 110 can compare the set of derivative data in FIG. 5 to the set of derivative data in FIG. 6. Thus, the data 512 and 514 can be compared with the data 612 and 614 to determine whether each of the data corresponds to a parking space or not. If the data do correspond to parking spaces, the data analysis unit 110 can store the sequential location of the parking space.

In one embodiment, the data analysis unit 110 can also determine, in addition to the location of perpendicular parking spaces or parallel parking spaces, the location of an open gate or entrance in a structure surrounded by walls or objects. In such a scenario the data analysis unit 110 can use a third predetermined distance as a threshold to determine which data to analyze further as possible locations for the open gate. The third predetermined distance can be the first predetermined threshold, the second predetermined threshold, or any other type of distance which would provide an indication that an open gate is present at a particular location.

In another embodiment, instead of an open gate, the data analysis unit 110 can also determine the sequential location of a closed gate or entrance which has a sufficient amount of openings within the closed gate to distinguish the closed gate from the surrounding walls. In yet another embodiment the data analysis unit 110 can also analyze data which do not exceed the first predetermined distance and/or the second predetermined distance, but which are within a tolerance level. The tolerance level can be determined based on an accuracy of the sensor, an amount of data collected, and/or any other factors which may reduce an incidence of false negatives.

The gap definition unit 112 is communicatively coupled to the data analysis unit 110 and defines a set of gaps based on the analysis of the set of derivative data greater than the first predetermined distance and/or the second predetermined distance. Once the sequential location of the gaps are determined by the data analysis unit 110, the gap definition unit 112 can more fully define the contour of the gaps and determine, for example, the substantial shape and dimensions of the gaps. The gap definition unit 112 can also determine all of the sequential locations which the gaps cover.

The report generation unit 114 is communicatively coupled to the gap definition unit 112 and generates a report including the defined set of gaps between objects. The report can be displayed, for example, on the display 116. The report, for example, can be a graphical representation of substantial locations, shapes, and dimensions of the gaps relative to the automobile 200.

The report can also be color coded. For example, an object can have a first color, while gaps can have a second color. The first color and the second color can be chosen such that there is sufficient contrast between the first color and the second color to allow easy identification of the gaps and the objects. In addition, perpendicular and parallel parking spaces could also be differentiated by different colors. Likewise, gate openings can also be differentiated by a different color. Furthermore, all or a portion of the color of each of the gaps and/or the objects can be altered in response to the distance from the automobile 200.

Thus, the gap detection system 100 allows an easy detecting of gaps between objects. The gap detection system 100 allows the driver to determine the location of gaps in a more precise manner than relying solely on the ocular capabilities of the driver. This can reduce fuel consumption by allowing the driver to know where gaps such as parking spaces are located and prevent him from inadvertently driving the automobile past a desirable parking space or driving to a perceived parking space which is not actually a parking space. In addition, the gap detection system 100 allows the driver to differentiate between perpendicular parking spaces and parallel parking spaces. This enables the driver to selectively determine which parking space he wants to use for the automobile 200 where one type of parking space may be more desirable than the other type depending on the driver preferences. The gap detection system 100 also allows the driver to easily find other gaps, such as an entrance to a building surrounded, for example, by a wall.

Figure 7:
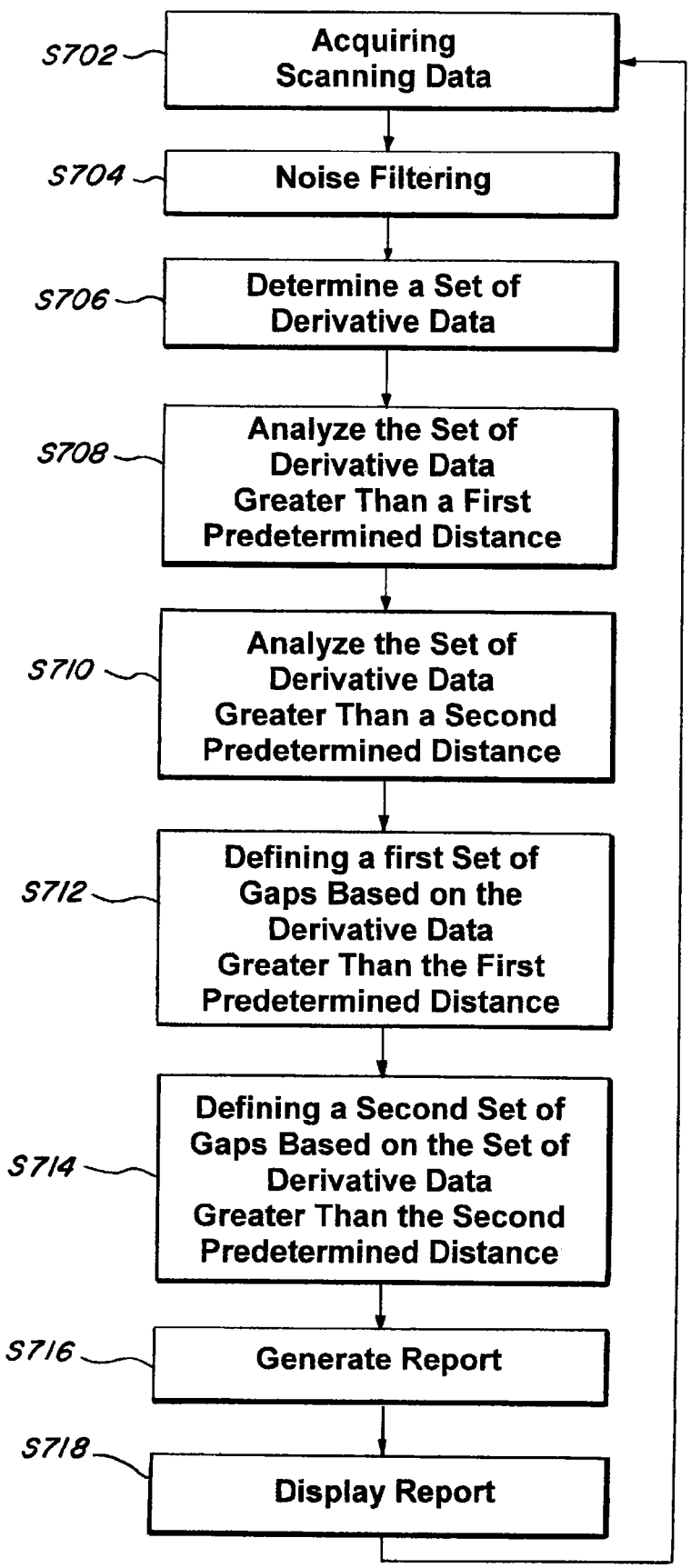
FIG. 7 is a flow chart of a process according to an embodiment of the present invention.

FIG. 7 is a flow chart of a process according to an embodiment of the present invention. In Step S702, a set of scanning data is acquired. For example, the sensor 104 can acquire a set of scanning data as shown in FIG. 1. In Step S704, noise in the set of scanning data is filtered. For example, the noise filter unit 106 filters the set of scanning data as shown in FIG. 1. In Step S706, a derivative set of data is generated by determining the derivative of the set of scanning data. For example, the data derivative unit 108 determines a set of derivative data from the set of scanning data as shown in FIG. 1, FIG. 3, FIG. 5, and FIG. 6.

In Step S708, the set of derivative data greater than the first predetermined distance is analyzed. For example, the data analysis unit 110 can analyze the set of derivative data greater than the first predetermined distance to determine a location of gaps such as perpendicular parking spaces as shown in FIG. 1, FIG. 2, and FIG. 3.

In Step S710, the set of derivative data greater than the second predetermined distance is analyzed. For example, the data analysis unit 110 can analyze the set of derivative data greater than the second predetermined distance to determine a location of gaps such as parallel parking spaces as shown in FIG. 1, FIG. 4, FIG. 5, and FIG. 6.

In Step S712, a first set of gaps are defined based on the derivative data greater than the first predetermined distance. For example, the gap definition unit 112 can define the first set of gaps based on the derivative data greater than the first predetermined distance.

In Step S714, a second set of gaps are defined based on the derivative data greater than the second predetermined distance. For example, the gap definition unit 112 can define the second set of gaps based on the derivative data greater than the second predetermined distance.

In Step S716, a report is generated including the first set of gaps and/or the second set of gaps. For example, the report generation unit 114 generates a report including the first set of set of gaps and/or the second set of gaps. In Step S718, the report is displayed. For example, the display 116 displays the report. The display 116 can display the report, for example, such that it is visible to the driver. The process can then repeat by proceeding to step S702 until a natural breaking point and/or an entity such as a person or a machine terminates the process.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. Furthermore the method and/or algorithm need not be performed in the exact order described, but instead may be varied. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for detecting gaps between objects comprising:
    acquiring a set of scanning data, each of the scanning data indicating, for a sequential location, a distance of a nearest object from a predetermined location;
    filtering the set of scanning data to remove noise;
    determining a set of derivative data from the set of scanning data;
    analyzing the set of derivative data greater than a first predetermined distance;
    defining a first set of gaps between objects based on the set of derivative data greater than the first predetermined distance; and
    generating a report including the first set of gaps between objects.

2. The method of claim 1 wherein the step of determining the derivative of the set of scanning data includes determining the absolute derivative of the set of scanning data.

3. The method of claim 1 wherein the predetermined location is an automobile, and the first predetermined distance is at least a width of the automobile.

4. The method of claim 1 wherein the predetermined location is an automobile, and the first predetermined distance is at least a parking width of the automobile.

5. The method of claim 1 further comprising analyzing the set of derivative data greater than a second predetermined distance, the second predetermined distance being greater than the first predetermined distance.

6. The method of claim 5 further comprising:
defining a second set of gaps between objects based on the set of derivative data greater than the second predetermined distance; and
generating a report including the second set of gaps between objects.

7. The method of claim 6 wherein the predetermined location is an automobile, and the second predetermined distance is at least a length of the automobile.

8. The method of claim 6 wherein the predetermined location is an automobile, and the first predetermined distance is at least a parking width of the automobile.

9. The method of claim 6 wherein the first set of gaps are perpendicular parking spaces and the second set of gaps are parallel parking spaces.

10. The method of claim 1 wherein the step of filtering the set of scanning data to remove noise includes filtering the set of scanning data with a time domain frequency filter or a spatial domain frequency filter.

11. A method for detecting gaps between objects comprising:
acquiring a set of scanning data, each of the scanning data indicating, for an angular location, a distance of a nearest object from a predetermined location;
filtering the set of scanning data to remove noise;
determining a set of derivative data from the set of scanning data;
analyzing the set of derivative data greater than a first predetermined distance;
analyzing the set of derivative data greater than a second predetermined distance, the second predetermined distance being greater than the first predetermined distance;
defining a first set of gaps between objects based on the set of derivative data greater than the first predetermined distance;
defining a second set of gaps between objects based on the set of derivative data greater than the second predetermined distance; and
generating a report including the first set of gaps between objects and the second set of gaps between objects.

12. The method of claim 11 wherein the step of determining the derivative of the set of scanning data includes determining the absolute derivative of the set of scanning data.

13. The method of claim 11 wherein the predetermined location is an automobile, the first predetermined distance is at least a width of the automobile, and the second predetermined distance is at least a length of the automobile.

14. The method of claim 11 wherein the predetermined location is an automobile, the first predetermined distance is at least a parking width of the automobile, and the second predetermined distance is at least a parking length of the automobile.

15. The method of claim 11 wherein the step of filtering the set of scanning data to remove noise includes filtering the set of scanning data with a time domain frequency filter or a spatial domain frequency filter.

16. The method of claim 11 wherein the first set of gaps is perpendicular parking spaces and the second set of gaps is parallel parking spaces.

17. A system in an automobile for detecting gaps between objects comprising:
a sensor acquiring a set of scanning data, each of the scanning data indicating, for a sequential location, a distance of a nearest object from a predetermined location;
a noise filter unit communicatively coupled to the sensor filtering the set of scanning data to remove noise;
a data derivative unit communicatively coupled to the noise filter extracting a set of derivative data from the set of scanning data;
a data analysis unit communicatively coupled to the data derivative unit analyzing the set of derivative data greater than a first predetermined distance, and analyzing the set of derivative data greater than a second predetermined distance, the second predetermined distance being greater than the first predetermined distance;
a gap definition unit communicatively coupled to the data analysis unit defining a first set of gaps between objects based on the set of derivative data greater than the first predetermined distance, and defining a second set of gaps between objects based on the set of derivative data greater than the second predetermined distance; and
a report generation unit communicatively coupled to the gap generation unit generating a report including the first set of gaps between objects and the second set of gaps between objects.

18. The system of claim 17 wherein the data derivative unit extracts an absolute derivative of the set of scanning data to form the set of derivative data.

19. The method of claim 18 wherein the predetermined location is an automobile, the first predetermined distance is at least a parking width of the automobile, the second predetermined distance is at least a parking length of the automobile, the first set of gaps are perpendicular parking spaces, and the second set of gaps are parallel parking spaces.

20. The method of claim 19 wherein the step of filtering the set of scanning data to remove noise includes filtering the set of scanning data with a time domain frequency filter or a spatial domain frequency filter.

* * * * *